ized Vinylic Polymers

United States Patent [19]
Falender et al.

[11] 4,070,414
[45] Jan. 24, 1978

[54] TOUGHENED MERCAPTOSILOXANE MODIFIED BULK POLYMERIZED VINYLIC POLYMERS

[75] Inventors: James R. Falender, Sanford; John C. Saam, Midland, both of Mich.

[73] Assignee: Dow Corning Corporation, Midland, Mich.

[21] Appl. No.: 679,621

[22] Filed: Apr. 23, 1976

[51] Int. Cl.$^2$ ............................................. C08L 83/10
[52] U.S. Cl. .................................... 260/825; 260/827; 260/29.6 NR; 260/29.7 NR; 260/29.7 RP
[58] Field of Search ....... 260/827, 29.6 NR, 29.7 NR, 260/29.7 RP, 825

[56] References Cited

U.S. PATENT DOCUMENTS

| | | | |
|---|---|---|---|
| 3,873,499 | 3/1975 | Michael et al. | 260/46.5 E |
| 3,879,491 | 4/1975 | Lindsey et al. | 260/827 |
| 3,923,923 | 12/1975 | Fiedler | 260/827 |

*Primary Examiner*—Howard E. Schain
*Assistant Examiner*—Natalia Harkaway
*Attorney, Agent, or Firm*—Robert F. Fleming, Jr.

[57] ABSTRACT

Improvement in impact strength of certain vinylic polymers is obtained by dissolving a mercaptosiloxane-dimethylsiloxane copolymer in a vinylic monomer and converting the monomer to a polymer by bulk or suspension polymerization in the presence of a free radical generator. For example, a copolymer of mercaptopropylmethylsiloxane and dimethylsiloxane is dissolved in styrene and the styrene is copolymerized with acrylonitrile in bulk and/or in water suspension using benzoyl peroxide as a catalyst.

20 Claims, No Drawings

TOUGHENED MERCAPTOSILOXANE MODIFIED BULK POLYMERIZED VINYLIC POLYMERS

BACKGROUND OF THE INVENTION

The use of rubbery polymers to toughen thermoplastic vinylic polymers is well known. This has been done with both the organic rubbers such as polybutadiene and with organosilicon polymers such as vinyl-containing organopolysiloxane gums. The toughening can be accomplished by two methods. One is by bulk or suspension polymerization in which the organosiloxane is dissolved in the monomer and the monomer is polymerized until it becomes quite viscous and the polymer is then suspended in water in relatively large droplets and the polymerization completed. Secondly, the preparation can be carried out by emulsifying the monomeric vinylic compound and polymerizing it in emulsion in the presence of the emulsified organosilicon compound.

There are certain distinct differences between these two processes. The present case is primarily concerned with the regulation of particle size of the distributed organosiloxane phase. In bulk or suspension polymerization, the particle size of the gelled organopolysiloxane distributed through the thermoplastic matrix is influenced by the reactive substituents on the silicon atoms of the organopolysiloxane. The particle size in turn effects significantly the resulting impact strength of the finished polymer. It is, of course, understood by those skilled in the art that adequate stirring is needed in bulk polymerization. On the other hand, in emulsion polymerization the particle size is determined primarily, not by the substituents on the silicon atom, but by the conditions used to emulsify the organopolysiloxane. Thus, the two processes are not equivalent and those factors which effect impact strength in bulk or suspension polymerization are not necessarily a factor in emulsion polymerization.

U.S. Pat. No. 3,923,923 teaches bulk polymerization of styrene having dissolved therein vinyl-containing siloxane. In column, 4, line 66 to column 5, line 5, patentee shows the use of mercaptoalkylsiloxane in addition to the vinylsiloxane. However, the patentee requires the presence of vinyl on the silicon and, in fact, it has been shown that the use of mercaptoalkyl compounds in conjunction with vinyl does not improve the impact strength of polystyrene and may even degrade the impact strength (see Example 7 infra). Furthermore, this patent teaches nothing about copolymers of styrene with other monomers such as acrylonitrile and in view of the failure to improve the impact strength of styrene, it would not be obvious from the reference that the use of mercaptoalkylsiloxanes alone or in combination with vinylsiloxanes would improve the impact strength of other thermoplastics.

U.S. Pat. No. 3,879,491 teaches the bulk polymerization of styrene and other vinylic monomers including some of those in the instant application, by incorporating therein vinyl-containing organopolysiloxane gums and then polymerizing the mixture with a free radical generator. However, this patent does not teach the use of mercaptoalkylsiloxanes either alone or in conjunction with vinyl and requires that vinyl be present in the organosiloxane. The basis for patentability of the instant process and materials over that disclosed in said patent is the fact that by using mercaptoalkylsiloxanes, one obtains better impact strength with the monomers claimed herein than one does with vinyl-containing siloxanes. In this connection there is an anomalous result reported in Example 3 of the U.S. Pat. No. 3,879,491 which shows a notched Izod impact strength of 2.03 foot pounds per inch of notch for a styrene-acrylonitrile copolymer modified with a vinyl-containing methylpolysiloxane. Applicants have repeated the impact test using a sample of the same plastic prepared in this example and have been unable to duplicate the 2.03 results. The results obtained by applicants on duplicate runs were 0.49 and 0.46 for the Izod impact strength and this is in line with values of 0.4 to 0.7 obtained in other experiments when they bulk polymerized styrene in the presence of vinyl-containing organosiloxane gums. By contrast, employing the process of this invention one obtains Izod impact strengths of from 1.5 to 3.5 with styrene-acrylonitrile copolymers. Consequently, the improvement in impact strengths over the process U.S. Pat. No. 3,879,491 is real and is entirely unexpected based on the teachings of this patent or a combination of this patent with the art.

Other patents such as U.S. Pat. Nos. 3,532,729 and 3,898,300 show modifying vinylic polymers by employing the emulsion polymerization technique. These references are less pertinent to the instant application for the reasons stated above with regard to the difference between emulsion and bulk polymerization. Improving impact strength of vinyl polymers using emulsion polymerization and mercaptosiloxanes is claimed in the copending application Ser. No. 679,595, filed on an even date herewith, of James R. Falender, Claudia M. Mettler and John C. Saam entitled "Toughened Mercaptosiloxane Modified Emulsion Polymerized Vinylic Polymers."

The object of this invention is to further improve the impact strength of bulk polymerized vinylic monomers by employing mercaptoalkylsiloxanes as the grafting site between the vinylic polymer and the organosiloxane.

BRIEF DESCRIPTION OF THE INVENTION

This invention relates to a composition of matter consisting essentially of a matrix of (1) a thermoplastic vinylic polymer having dispersed therein (2) gel particles of a rubbery organopolysiloxane, (1) being of the group consisting of polymethylmethacrylate, copolymers of methyl methacrylate with minor amounts of other vinylic monomers and copolymers of styrenic monomers with minor amounts of acrylonitrile monomers, 1,4-butadienes, acrylate monomers, vinyl acetate and vinyl halides, (2) being formed from a copolymer, dispersible in at least one of the monomers from which (1) is prepared, of from 0.001 to 10 mol percent mercaptosiloxane units of the formula $HSRSi(R')_nO_{3-n/2}$ in which R has 1 to 8 atoms and is a divalent saturated aliphatic hydrocarbon radical or a trivalent saturated aliphatic hydrocarbon radical in which two valences are satified by the same silicon atom; $n$ is 0 to 2 and $R'$ is a hydrocarbon radical free of aliphatic unsaturation of 1 to 8 carbon atoms, the remainder being essentially all dimethylpolysiloxane, the proportion of (2) being from 1 to 40 percent by weight based on the combined weights of (1) and (2) said composition having been prepared by bulk or suspension polymerization of at least one monomer (1) having (2) dispersed therein, in the presence of a free radical generator.

This invention also relates to the above compositions in which (2) contains up to 30 mol percent vinyl siloxane, either copolymerized with or blended with the mercaptosiloxane.

DETAILED DESCRIPTION OF THE INVENTION

For the purpose of this invention the thermoplastic matrix can be a homopolymer of methyl methacrylate or a copolymer of methyl methacrylate with minor amounts of other vinylic monomers such as acrylate monomers of the formula $CH_2=CYCOOA$ in which Y is H or methyl and A is H or an alkyl radical of 1 to 8 carbon atoms such as ethyl acrylate, butyl acrylate, ethyl methacrylate, hexyl acrylate, acrylic acid or methacrylic acid; acrylonitrile monomers, i.e. acrylonitrile and methacrylonitrile; styrenic monomers (i.e., styrene, ring substituted alkyl styrenes or ring substituted chlorostyrenes) such as vinyl toluene, butyl styrene, 2,4-dichlorostyrene and the like; alphamethylstyrene; 1,4-butadienes such as butadiene, isoprene or chloroprene; vinyl acetate and vinyl halides of the formula $CH_2=CH_aH_{2-a}$ in which $a$ is 1 or 2 and X is chlorine or fluorine such as vinyl chloride, vinylidene chloride or vinyl fluoride.

The thermoplastic vinylic polymers (1) can also be copolymers of styrenic monomers as defined above with minor amounts of the above-identified acrylic monomers, acrylonitrile monomers, vinyl acetate, vinyl halides and 1,4-butadienes. It is to be understood that any of the copolymers can contain more than two co-monomers. The term minor amount as used herein means less than 50 weight percent. The preferred thermoplastic is a copolymer of styrene with minor amounts of acrylonitrile.

The organosiloxanes employed in this invention are those which contain $HSRSi(R')_nO_{3-n/2}$ units in which R is a divalent or trivalent saturated aliphatic hydrocarbon radical of 1 to 8 carbon atoms. Thus, the mercapto group can be those in which R is difunctional such as $HS(CH_2)_3Si$, $HSCH_2Si$, $HS(CH_2)_2Si$,

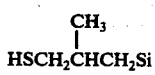

or $HS(CH_2)_8Si$— or those in which R is trifunctional such as

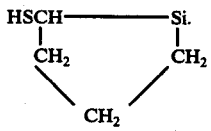

In the latter case two valences of R are satisfied by the same silicon atom. R' is a hydrocarbon radical free of aliphatic unsaturation of 1 to 8 carbon atoms such as methyl, ethyl, butyl, phenyl or cyclohexyl and $n$ is 0 to 2. The remaining siloxane units in (2) are "essentially all" dimethylsiloxane units. The term "essentially all" means that there can be small amounts of $R'SiO_{3/2}$ units, $R'_2SiO$ units, $R'_3SiO_{.5}$ units or $SiO_2$ units in such amount that they do not materially affect the performance of the siloxanes for the intended purpose of improving impact strength. In any event, it is essential that siloxane (2) be soluble or dispersible in at least one of the monomers from which (1) is prepared. This being the case, it is important that siloxane (2) not contain sufficient amount of trifunctional or tetrafunctional silicon atoms to cause gelation of the siloxane prior to polymerization with the vinylic monomer. For the purpose of this invention, the mol percent HSRSi units should be from 0.001 to 10 mol percent, preferably 0.5 to 5 mol percent.

If desired, siloxane (2) can contain some alkenyl substituted organosilicon units in which the alkenyl group has 2 to 4 carbon atoms such as vinyl, allyl or methallyl provided the alkenyl siloxane is not present in amount more than 30 mol percent of the total siloxane. The alkenyl siloxane can be either copolymerized with the mercaptosiloxane or it can be blended with the mercaptosiloxane. When the siloxane (2) contains both alkenyl siloxane units and mercaptosiloxane units, care should be taken that premature gelation due to the interaction of the mercapto and the alkenyl groups does not occur. This can be accomplished in several ways. For one, the amount of mercaptosiloxane can be kept below 2 mol percent if the amount of vinylsiloxane is from 4 to 30 mol percent. Conversely, the amount of vinylsiloxane can be kept below 1 or 2 mol percent as the amount of mercaptosiloxane is raised above 2 mol percent. Alternatively, in the case of blends the vinylsiloxane can be mixed with the mercaptosiloxane just prior to dispersion in the vinylic monomer. Finally, it is possible to use inhibitors which prevent the interaction of the vinyl and mercaptosiloxane. Examples of such inhibitors are paramethoxyphenol and the other inhibitors described in U.S. Pat. No. 3,873,499. Obviously, when an inhibitor is used it is best removed just prior to polymerization of the vinylic monomer.

The free radical generator employed in this invention can be any of the known free radical generators which will function under the reaction conditions. The term free radical generator includes both chemical generators such as peroxides such as di(tertiary-butylperphthalate), tertiary-butylpercaprylate, tertiary-butylperbenzoate, di-acetylperoxide, acetylbenzoyl peroxide, dipropionyl peroxide, dilauryoyl peroxide, tetralin peroxide, cumene hydroperoxide, tertiary-butylhydroperoxide or methyl cyclohexyl hydroperoxide; alkali metal and ammonium persulfates, perborates and percarbonates; aliphatic azobisnitriles such as azo-bis-isobutyronitrile; and non-chemical generators such as heat and energy ionizing radiation such as ultraviolet light, X-rays and electrons.

The amount of free radical generators relative to the siloxane and monomer used is not critical. Obviously, the amount of free radical should not be sufficient to cause run away reaction. Thus, the optimum amount of free radical generator varies with the temperature employed and with the activation temperature of the generator. If the conditions are too drastic, there is the added danger that the mercaptan will be converted to a sulfide rather than grafting to the vinylic polymer.

The proportion of silicone (2) should be from 1 to 40 percent by weight based on the total weights of (1) and (2).

The compositions of this invention are prepared by the conventional bulk and suspension polymerization methods. The best method of preparing the compositions of this invention is to dissolve the organosiloxane (2) in at least one of the vinylic monomers. It is not necessary that the siloxane be soluble in both monomers, but if it is insoluble in one of the monomers, it is important that the siloxane be dissolved in the first monomer and the second monomer added slowly under polymerization conditions until grafting has occurred between the siloxane and the vinylic polymer. After grafting has occurred, the remainder of the second monomer can be added without agglormeration of the siloxane. Since it is important that there be uniform dispersion of the siloxane throughout the matrix of the finished polymer, it is important, of course, that little or no agglormeration of the siloxane occur in the initial phases of the polymerization. It is important that adequate stirring be maintained during the entire operation.

After the siloxane has been dispersed in one of the monomers and at least some grafting has occured, the remaining monomeric vinylic compounds can be added and polymerization promoted until the mass becomes quite viscous. At this point, it is desirable to suspend the partly polymerized material in water using such well known suspension agents such as carboxymethyl cellulose, gum agar, polyvinyl alcohol, polyacrylic acid, hydroxy propylmethyl cellulose, methyl cellulose, colloidal silica, and colloidal clay. The suspension is agitated to provide droplets of the organic phase such as about 1/16 to ⅛ inch in diameter. The suspension is then brought to polymerization conditions and the polymerization completed. The resulting product is obtained by removing any unreacted monomer, separating the product which is in bead form by, for example, filtration, washing and drying to obtain the bulk material.

The temperature of polymerization is the same for these products as it is for the well-known polymerization of vinylic monomers using free radical generators. In general, temperatures from 30° to 200° C. are sufficient. Since free radicals are deteriorated by oxygen, it is desirable that the reaction be carried out in the absence of air.

The products obtained by this invention are thermoplastic matrixes of the vinylic polymers having dispersed uniformly therein gel particles of the siloxane. These gel particles act as reinforcing agents for the vinylic polymer and thereby increases the resistance to shock. The products of this invention can be molded or shaped by any of the conventional techniques for molding such as by pressure molding, injection molding and the like, used in the thermoplastic art.

The impact strength of the products of this invention are determined by the notched Izod impact test in accordance with ASTM-D-256-56 wherein the notch is 45° and is 0.1 inch deep. The numerical values are in foot pounds per inch of thickness.

As can be seen from the examples infra optimum conditions to obtain the best impact strength vary depending upon the mol percent SH in the siloxane, the type of free radical generator used, the amount of organosiloxane dispersed in the thermoplastic matrix and the particular vinylic monomer being used. Thus, to optimize the impact strength of any particular vinylic thermoplastic a certain amount of tests are needed to select the best concentration of SH in (2), the best free radical generator and the best amount of siloxane. It is preferred that the siloxane be present in amount from 5 to 30 weight percent based on the total weight of siloxane and vinylic polymer.

The molecular weight of the siloxane employed is not critical so long as it forms rubbery gel particles when grafted in the vinylic matrix. Thus, siloxanes varying from fluids to non-flowing soluble gums can be used. Viscosities of 100,000 cs. or above are preferred.

The compositions of this invention can contain other additives normally employed in thermoplastic compositions such as fillers, thermostability additives, ultraviolet stabilizers, and the like. In addition to the improved impact strength, the compositions of this invention also have improved surface lubricity and other properties normally imparted by organosilicon compounds.

The following examples are illustrative only and should not be construed as limiting the invention which is properly delineated in the appended claims.

EXAMPLE 1

The polysiloxanes employed in this example were prepared by polymerizing the appropriate amounts of a mixture of cyclic dimethylsiloxanes, cyclic methylvinylsiloxanes, and cyclic 3-mercaptopropylmethylsiloxane. A small amount of a dimethylvinyl endblocked dimethylpolysiloxane fluid was used as an endblocker. The mixed siloxanes were stirred for about 15 minutes at room temperature and 0.5 percent by weight trifluoromethyl sulfonic acid was added as a catalyst. As soon as thickening was observed (about 20 minutes) a dry nitrogen purge was started to increase the degree of polymerization by removing water. After 21 days the polymer was neutralized by mechanically agitating it with 1 percent by weight $NaH_2PO_4.H_2O$. For comparative purposes, polymers of dimethylsiloxane and methylvinylsiloxane, as shown in the table below, were made by the same procedure.

Varying polymers prepared as above were polymerized with styrene and acrylonitrile by the following procedure. A typical formulation would be 128 g. of styrene purified with alumina, 52 g. of acrylonitrile purified with alumina, 50 g. of the organosiloxane polymer, 775 g. of distilled water, 4.5 g. of carboxymethyl cellulose and 0.45 g. of benzoyl peroxide. The amount of organosiloxane employed was either 21.7 percent or 10 percent based on the total weight of the organosiloxane and vinylic polymer.

The organosiloxane was dissolved in styrene over a period of two days. Carboxymethyl cellulose was dissolved in water. All of the styrene silicone solution and 12.5 ml. of the acrylonitrile were stirred in a kettle with a nitrogen purge. The mixture was heated to 100° C. with the stirrer rotating at 125 rpm. and the reaction was held at 100° to 105° C. until the material became almost too thick to stir. The remainder of the acrylonitrile was then dripped at a rate consistent with the above temperature specifications. In general, the reaction time was about 4 hours.

The viscous reaction product was cooled to 70° C. and benzoyl peroxide was stirred in. The water-carboxymethyl cellulose solution was then stirred in and the reaction was continued for 16 hours at 80° C. with rapid stirring. Unreacted monomer was removed by steam distillation and the resulting beads were washed with distilled water and isopropanol. After drying in a vacuum oven two hours at 80° C., the beads were mixed 10 minutes at 177° C. at a stirring speed of 62 rpm. and pressed 10 minutes at 177° C. The notched Izod impact strength was determined. The results are shown in the table below.

| Sample No. | Composition of Silicone Polymer | | | Izod Impact (foot lbs.) |
|---|---|---|---|---|
| | Amount Siloxane Percent by Weight | Mol % Vinyl | Mol % Mercaptosiloxane | |
| 1 | 21.7 | 4 | — | 0.3 |
| 2 | 21.7 | 10 | — | 0.9 |
| 3 | 21.7 | 20 | — | 0.7 |
| 4 | 21.7 | 4 | 0.2 | 2.5 |
| 5 | 21.7 | 4 | 0.5 | 2.4 |
| | 21.7 | 4 | 1.0 | 3.5 |
| | 10 | 4 | — | 0.4 |
| | 10 | 10 | — | 0.4 |
| | 10 | 20 | — | 0.3 |
| | 10 | 4 | 0.5 | 1.5 |

It can readily be seen from this that inclusion of the mercaptopropylsiloxane significantly improved the impact strength of the styrene acrylonirile copolymer.

Photomicrographs were taken of samples 1 and 5 from the above table and it was found that the particle diameter in microns of the siloxane gel in sample 5 was 0.1 to 0.5 microns whereas that in sample 1 was 1 to 10 microns. This shows a much finer particle size distribution of the gels obtained using mercaptosiloxanes as compared with the vinylsiloxane alone.

EXAMPLE 2

This example shows the use of siloxanes containing mercapto groups only. A copolymer of 99 mol percent dimethylsiloxane and 1 mol percent of 3-mercaptopropylmethylsiloxane was prepared by the procedure of Example 1. The resulting polymer was a gum having a Williams plasticity of 0.07. The siloxane was copolymerized with styrene and acrylontrile by the procedure of Example 1 employing the following ingredients. 128 g. of purified styrene, 20 g. of the silicone gum described above, 52 g. purified acrylonitrile, 775 g. distilled water, 6 g. carboxymethyl cellulose, and 0.45 g. of benzoyl peroxide. The resulting graft copolymer was molded as in Example 1 and it was found to have a notched Izod impact strength of 3.57 foot pounds per inch. The silicone content was found by analysis to be 7.1 percent by weight based on the combined weight of the polysiloxane, polystyrene and acrylonitrile.

EXAMPLE 3

This example shows that optimum amount of mercaptosiloxane for styrene-acrylonitrile copolymers using different free radical generators. Graft copolymers were prepared in accordance withthe procedure of Example 2 employing the free radical generators and the silicone gums shown below.

| Percent Silicone by Weight Based on the Styrene And Acrylonitrile | Mol % Mercaptopropylmethyl-Siloxane* | Free Radical Generator | Notched Izod Impact (ft. lbs./in.) |
|---|---|---|---|
| 10 | 1 | azo-bis-isobutyronitrile | 0.71 |
| 7.1 | 1 | benzoyl peroxide | 3.57 |
| 8.7 | 5 | azo-bis-isobutyronitrile | 0.5 |
| 14 | 5 | benzoyl peroxide | 0.9 |

*The remainder of the siloxane was dimethylsiloxane.

EXAMPLE 4

This example shows the use of blends of mercaptopropylsiloxane and methylvinylsiloxane. Two copolymers were prepared. One was copolymer of dimethylsiloxane and methylvinylsiloxane prepared by potassium silanolate catalyzed copolymerization of dimethyl and methylvinyl cyclosiloxanes, and the other a copolymer of dimethylsiloxane and 3-mercaptopropylmethylsiloxane was prepared by the method of Example 2. These copolymers were blended in such proportion that the overall mol percent of mercaptopropylmethylsiloxane and vinylmethylsiloxane in the blends is given in the table below. Each of the blends was copolymerized with styrene and acrylonitrile as in the procedure of Example 1 and the resulting products were tested as in that example. The results are shown in the table below.

| Percent Silicone Based on the Weight of the Styrene And Acrylonitrile | Mol Percent Mercapto-siloxane | Mol Percent of Vinyl-siloxane | Free Radical Generator | Notched Impact Strength (lbs./in.) |
|---|---|---|---|---|
| 9.8 | 0.5 | 2 | Benzyl Peroxide | 1.32 |
| 8.7 | 0.5 | 2 | Azo-bis-isobutyronitrile | 0.70 |
| 9.0 | 0.5 | 10 | Benzyl Peroxide | 1.47 |

EXAMPLE 5

This example shows the toughening of polymethyl methacrylate. An organopolysiloxane gum was made according to the procedure of Example 2 except the mercaptopropylmethylsiloxane was in amount of 5 mol percent. The silicone gum was incorporated in methyl methacrylate plastic using the following recipe: 180 grams of methyl methacrylate, 20 grams of silicone gum, 1.8 grams of azo-bis-isobutyronitrile, 360 grams of distilled water and 2.4 grams carboxymethylcellulose. The silicone gum was dissolved in the metyl methacrylate and the carboxymethylcellulose was dissolved in water. 0.18 grams of azo-bis-isobutyronitrile was added to the silicone gum solution and the mixture stirred at 125 rpm. as a dry nitrogen purge was passed through the vessel. The temperature was increased to 75° C. When the solution became as thick as heavy syrup the temperature was lowered to 50° C. and the remainder of the nitrile was stirred into the mixture. The carboxymethylcellulose-water solution was then added and the mixture, stirred at 450 rpm. and allowed to reflux. After ½ hour the product was washed and dried at 100° C. and compression molded at 177° C.

For comparison, this experiment was repeated without any silicone and employing an organosilicon gum containing 4 mol percent vinylmethylsiloxane and 96 mol percent dimethylsiloxane in place of the mercaptopropylsiloxane. The notched Izod impact was determined for each sample and the results are shown in the table below.

| Amount of Silicone Added Percent By Weight | Functional Groups in the Organosilicon Compound | Notched Izod Impact (lbs./in.) |
|---|---|---|
| 0 | — | 0.34 |
| 10 | 5 Mol Percent SH | 1.5 |
| 10 | 4 Mol Percent Vinyl | 0.57 |

Thus, it can be seen that the mercaptopropylsiloxane gave far greater toughening than vinylsiloxane to the polymethylmethacrylate.

EXAMPLE 6

Procedure of Example 5 was repeated except that the amount of mercaptopropylmethylsiloxane in the siloxane gum was varied as shown in the table below. In each case the amount of silicone employed was 10 percent by weight based on the weight of the polymethyl methacrylate.

| Mol Percent Mercaptopropyl siloxane | Notched Izod Impact (ft. lbs./in.) |
|---|---|
| Blank | 0.34 |
| 0.5 | 0.9 |
| 1.0 | 0.54 |
| 5 | 1.5 |

The above procedure was repeated to compare the effectiveness of free radical generators.

| Mol % Mercaptopropylsiloxane | Free Radical Generator | Notched Izod Impact (ft. lbs./in.) |
|---|---|---|
| 1 | azo-bis-isobutyronitrile | 0.54 |
| 1 | benzoyl peroxide | 0.57 |
| 5 | azo-bis-isobutyronitrile | 1.5 |
| 5 | benzoyl peroxide | 0.8 |

EXAMPLE 7

This example is for comparison and shows the lack of improvement in the impact strength of polystyrene by using mercaptoalkylsiloxane in addition to vinylsiloxane.

In this example the siloxane was used in amount of 4 percent by weight based on the total weight of siloxane and styrene. The siloxane gums used contained 4 mol percent vinylmethylsiloxane and varying mol percent of mercaptopropylmethylsiloxane, the remainder being dimethylsiloxane.

36.76 g. of the silicone gum was dissolved in 919 g. of styrene and stirred in the polymerization vessel at 125 rpm. at 120° C. for 1.5 hours under nitrogen. The dispersion was cooled to 70° C. and 1.9 g. of benzoyl peroxide was added followed by a solution of 20 g. of sodium carboxymethylcellulose in 3100 ml. of water. The suspension was stirred and the temperature held at 80° C. for 16 hours. Unreacted monomer was then removed by steam distillation and the product was decanted, washed and dried. The resulting beads were molded and the impact strength determined as in Example 1. The results are shown below.

| Mol % Vinyl | Mol % SH | Impact Strength in ft. lbs./in. |
|---|---|---|
| 4 | 1.0 | 0.41 |
| 4 | 0.2 | 0.35 |
| 4 | 0.1 | 0.42 |
| 20 | 0 | 1.01 |
| 4 | 0 | 0.57 to 0.46* |

*Table III, col. 7 of U.S. Pat. No. 3,923,923.

That which is claimed is:

1. A composition of matter consisting essentially of a matrix of
    1. a thermoplastic vinylic polymer having dispersed therein
    2. gel particles of a rubbery organopolysiloxane, (1) being selected from the group consisting of polymethyl methacrylate, copolymers of methyl methacrylate with minor amounts of other vinylic monomers and copolymers of a styrenic monomer with minor amounts of a monomer selected from the group consisting of acrylonitrile monomers, 1,4-butadienes, acrylate monomers, vinyl acetate and vinyl halides, (2) being formed from a copolymer dispersible in at least one of the monomers from which (1) is prepared, (2) containing from 0.001 to 10 mol percent siloxane units of the formula HSRSi(R')$_n$O$_{3-n/2}$ in which R has 1 to 8 carbon atoms and is a divalent saturated aliphatic hydrocarbon radical or a trivalent saturated aliphatic hydrocarbon radical in which two valences are satisfied by the same silicon atom, $n$ is 0 to 2 and R' is a monovalent hydrocarbon radical free of aliphatic unsaturation of 1 to 8 carbon atoms, the remainder of (2) being essentially all dimethylsiloxane, the proportion of (2) being from 1 to 40 percent by weight based on the combined weights of (1) and (2) said composition having been prepared by bulk or suspension polymerization of at least one monomer (1) having (2) dispersed therein, in the presence of a free radical generator.

2. The composition of claim 1 in which (2) additionally contains up to 30 mol percent of alkenylsiloxane where the alkenyl group contains 2 to 4 carbon atoms.

3. The composition of claim 1 in which (2) is a copolymer of 3-mercaptopropylmethylsiloxane and dimethylsiloxane.

4. The composition of claim 2 in which (2) is a blend of mercaptopropylmethyl-dimethylsiloxane and vinylmethyl-dimethylsiloxane copolymers.

5. The composition of claim 2 in which (2) is a copolymer of dimethylpolysiloxane, mercaptopropylmethylsiloxane and vinylmethylsiloxane.

6. The composition of claim 1 in which (1) is a copolymer of styrene and acrylonitrile.

7. The composition of claim 1 in which (1) is polymethyl methacrylate.

8. The composition of claim 1 in which the mercaptosiloxane units in (2) are in amount from 0.5 to 5 mol percent.

9. The composition of claim 8 in which (1) is a copolymer of styrene and acrylonitrile and (2) is a copolymer of mercaptopropylmethylsiloxane and dimethylsiloxane.

10. The composition of claim 8 where (1) is polymethyl methacrylate and (2) is a copolymer of mercaptopropylmethylsiloxane and dimethylsiloxane.

11. The composition of claim 1 in which (2) is present in amount of 5 to 30 percent by weight.

12. The composition of claim 2 in which (2) is present in amount of 5 to 30 percent by weight.

13. The composition of claim 3 in which (2) is present in amount of 5 to 30 percent by weight.

14. The composition of claim 4 in which (2) is present in amount of 5 to 30 percent by weight.

15. The composition of claim 5 in which (2) is present in amount of 5 to 30 percent by weight.

16. The composition of claim 6 in which (2) is present in amount of 5 to 30 percent by weight.

17. The composition of claim 7 in which (2) is present in amount of 5 to 30 percent by weight.

18. The composition of claim 8 in which (2) is present in amount of 5 to 30 percent by weight.

19. The composition of claim 9 in which (2) is present in amount of 5 to 30 percent by weight.

20. The composition of claim 10 in which (2) is present in amount of 5 to 30 percent by weight.

* * * * *

UNITED STATES PATENT AND TRADEMARK OFFICE
CERTIFICATE OF CORRECTION

PATENT NO. : 4,070,414
DATED : January 24, 1978
INVENTOR(S) : James R. Falender; John C. Saam It is certified that error appears in the above-identified patent and that said Letters Patent are hereby corrected as shown below.

Column 2, line 55; the line reading "which R has 1 to 8 atoms and is a divalent saturated" should read "which R has 1 to 8 carbon atoms and is a divalent saturated"

Column 3, line 57; the line reading "2. The remaining siloxane units in (2) are "essentially all" should read "2. The remaining siloxane units in (2) are essentially all".

Column 3, line 58; the line reading " " dimethylsiloxane units. The term "essentially all" " should read "dimethylsiloxane units The term "essentially all" "

Column 4, line 46; the line reading "The amount of free radical generators relative to the" should read "The amount of free radical generator relative to the"

UNITED STATES PATENT AND TRADEMARK OFFICE
CERTIFICATE OF CORRECTION

PATENT NO. : 4,070,414

DATED : January 24, 1978

INVENTOR(S) : James R. Falender; John C. Saam

It is certified that error appears in the above-identified patent and that said Letters Patent are hereby corrected as shown below:

In Column 5, line 2; the line reading "monomer can be added without agglormeration of the" should read "monomer can be added without agglomeration of the"

In Column 5, line 6; the line reading "no agglormeration of the siloxane occur in the initial" should read "no agglomeration of the siloxane occur in the initial"

In Column 7, line 26; the line reading "pact strength of the styrene acrylonirile copolymer" should read "pact strength of the styrene acrylonitrile copolymer"

In Column 7, line 42; the line reading "merized with styrene and acrylontrile by the procedure" should read "merized with styrene and acrylonitrile by the procedure"

UNITED STATES PATENT AND TRADEMARK OFFICE
CERTIFICATE OF CORRECTION

PATENT NO. : 4,070,414

DATED : January 24, 1978

INVENTOR(S) : James R. Falender; John C. Saam

It is certified that error appears in the above-identified patent and that said Letters Patent are hereby corrected as shown below.

In Column 7, line 68; the line reading "were prepared in accordance withthe procedure of" should read "were prepared in accordance with the procedure of"

Signed and Sealed this

Fifteenth Day of December 1981

[SEAL]

*Attest:*

*Attesting Officer*

GERALD J. MOSSINGHOFF

*Commissioner of Patents and Trademarks*